INVENTOR.
Billy Joe Bohannan

Aug. 27, 1968  B. J. BOHANNAN  3,398,889
CONTROL SYSTEM FOR AIR CONDITIONERS AND THE LIKE
Filed Jan. 24, 1966  3 Sheets-Sheet 2
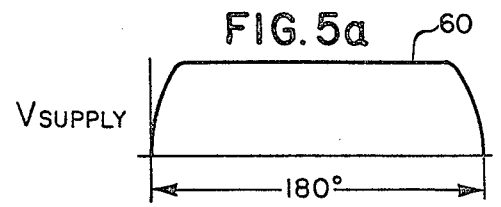
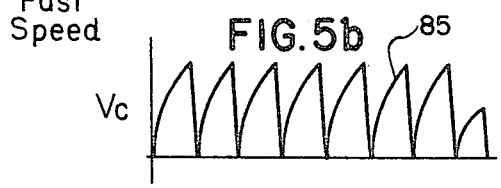
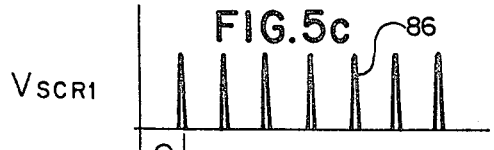
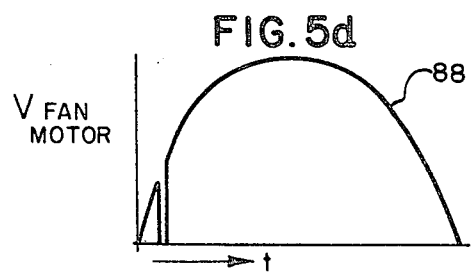
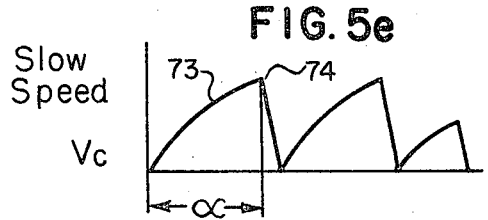
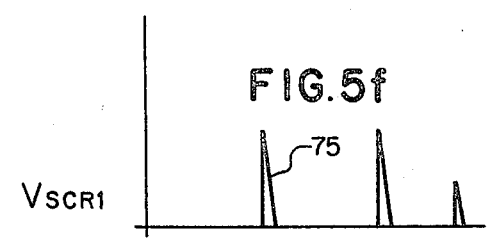
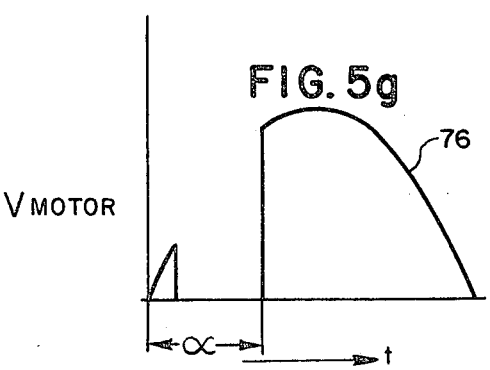
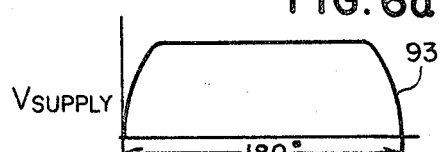
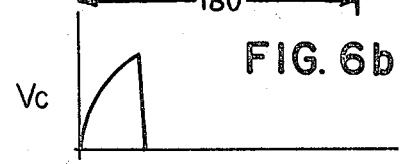
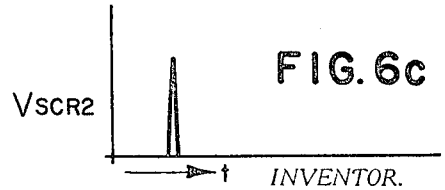
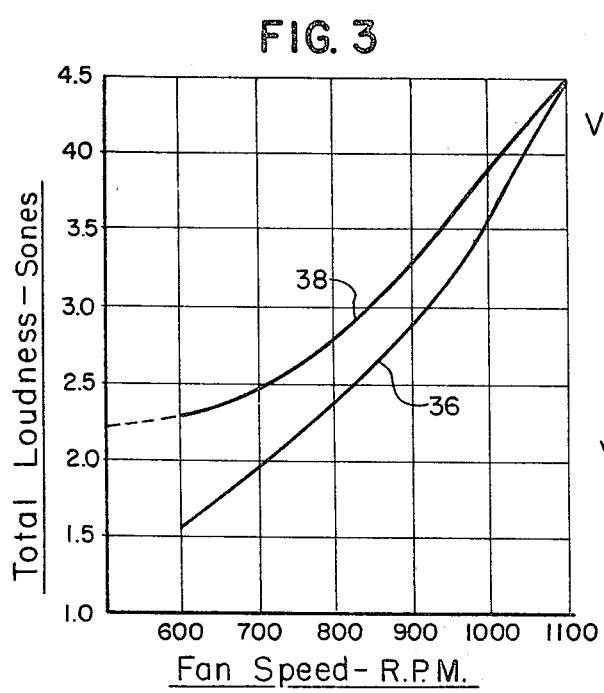
INVENTOR.
Billy Joe Bohannan
BY
Peter S. Lucyshyn
Attorney

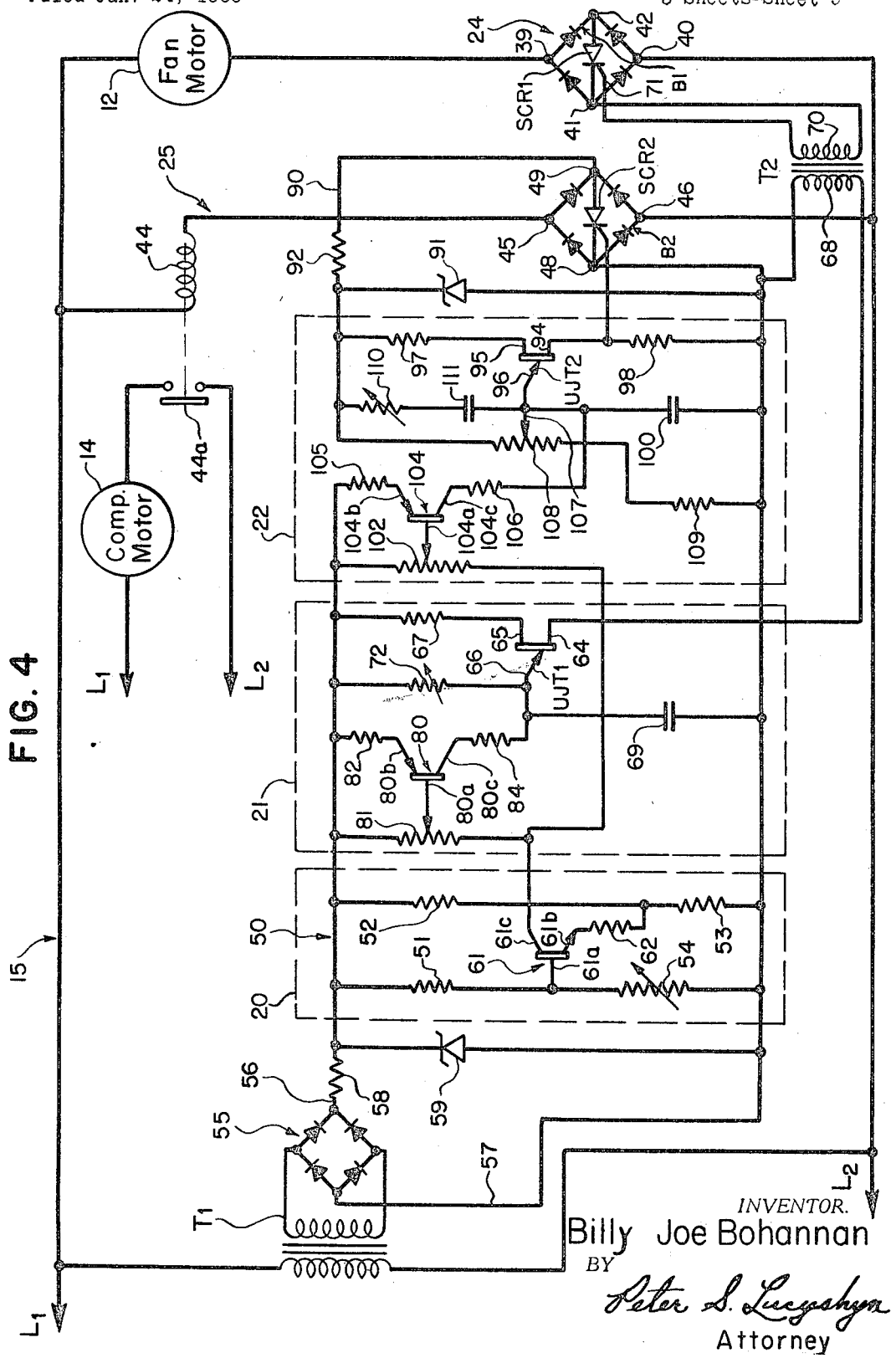

United States Patent Office 3,398,889
Patented Aug. 27, 1968

3,398,889
CONTROL SYSTEM FOR AIR CONDITIONERS AND THE LIKE
Billy J. Bohannan, Hot Springs, Ark., assignor to Borg-Warner Corporation, Chicago, Ill., a corporation of Illinois
Filed Jan. 24, 1966, Ser. No. 522,590
4 Claims. (Cl. 236—1)

ABSTRACT OF THE DISCLOSURE

A control system for an air conditioner, having a fan motor and a compressor motor, each controlled by a circuit responsive to temperature, so that air conditioner noise is held to a minimum, the fan motor being operated at a minimum speed below a first temperature, and then being proportionately varied between said first temperature and a second higher temperature, and the compressor motor being turned "on" at said first temperature while temperature is increasing, and being turned "off" at a third temperature, lower than either of the other two temperatures, with temperature decrease.

---

The invention relates generally to apparatus which responds to changes in a condition being controlled and automatically activates a pair of condition regulators to maintain the condition at a desired value.

More particularly, the invention relates to apparatus in an air conditioner for controlling speed of an air circulating fan motor, operating the motor at a predetermined minimum speed below a first temperature value and at a predetermined maximum speed above a second higher temperature value and providing proportional speed control of the fan motor between the respective temperature values, and also controlling "on" and "off" operation of a compressor motor, turning the compressor motor "off" if the temperature has decreased below a third predetermined temperature value and turning the compressor motor "on" if the temperature has increased above said predetermined first value.

One problem in constructing a room air conditioner which is to be used in a bedroom, for example, is to provide the necessary cooling capacity while maintaining the noise at a minimum. One major source of noise is forcing of air through the air conditioner unit. It has been found that noise increases with the velocity at which the air is circulated. Also, with more power units operating in the air conditioner the noise level will be greater; for example, with both the fan motor and compressor motor operating, the noise will be higher than if one or both of the units are deenergized and not operating.

Accordingly, it is an object of the present invention to provide a control system which is adapted to control energization of respective condition controllers in response to variations in a controlled condition so as to effect efficient and accurate control over the condition while maintaining operation of the condition controllers at a level which assures that noise is low.

It is a more detailed object of the present invention to provide an improved control system especially adapted for room-type air conditioners which automatically maintains the room temperature within a predetermined range operating a set of condition controllers, such as a fan motor and a compressor motor in order to effect efficient cooling of an enclosed area, such as a room, while assuring that noise from the air conditioner is held at a minimum level so as not to annoy persons therein.

It is an over-all object of the present invention to provide an economically manufacturable end easily maintainable control system adapted for use in operating devices, such as air conditioners and the like, wherein a condition, for example temperature, is maintained within a predetermined range by selective operation of respective condition controllers, for example, a fan motor and a compressor motor, while maintaining noise at a low annoyance level.

Other objects and advantages of the present invention will become apparent upon reading the following description and upon reference to the drawings in which:

FIGURE 3 is a graph of loudness measured in sones for a representative air conditioner as fan motor speed is varied;

FIGURE 4 is a schematic diagram of the inventive control system;

FIGURES 5a–5g show respective plots of voltages sensed across particular circuit elements in the fan motor control portion of the circuit of FIGURE 4; and FIGURES 6a–6c show respective plots of voltages sensed across particular circuit elements in the compressor motor control portion of the circuit of FIGURE 4.

Figure 1:
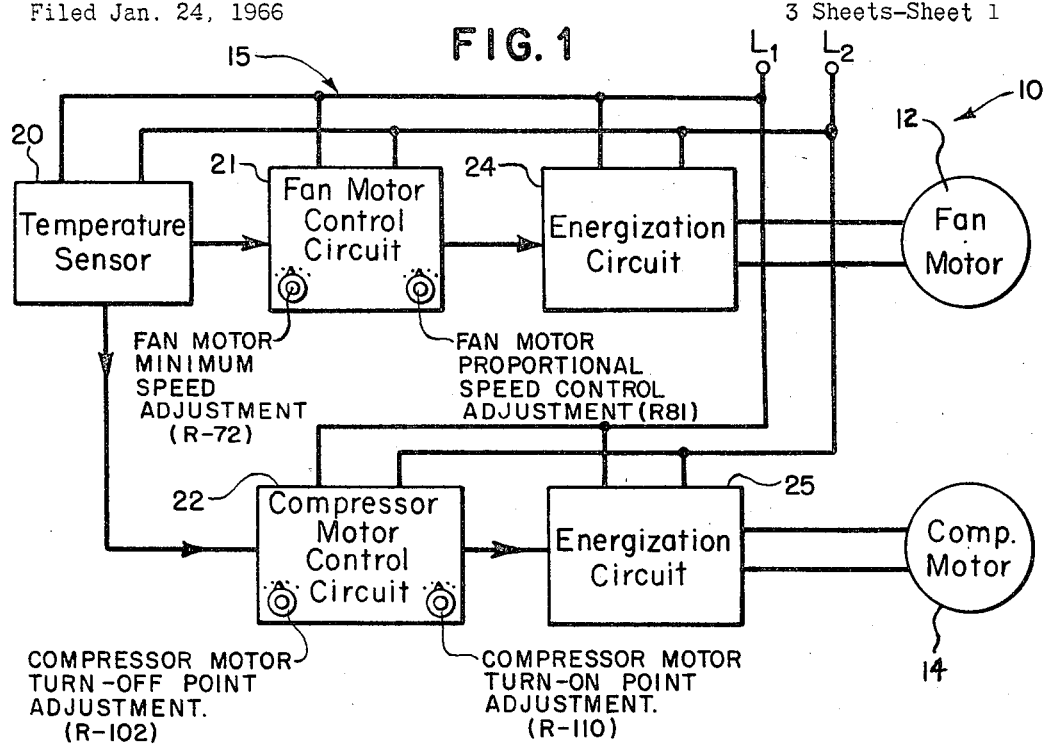
FIGURE 1 is a block diagram of a control system embodying the present invention.

Turning to the drawings, shown in FIGURE 1 is a block diagram of a condition controlling device 10, exemplarily shown as an air conditioner, embodying the present invention. Air conditioners customarily include a fan motor 12 for circulating air and a compressor motor 14 for cooling the air drawn into the unit. It is not necessary to show the details of the air circulating and refrigerating systems to introduce the present invention, as the noise problem in the preferred embodiment is solved by operating the fan motor and the compressor motor in a particular manner.

In accordance with the present invention, the condition controlling device 10 includes an improved control system 15 responsive to condition variations for programming operation of a set of condition controllers so as to automatically maintain the sensed condition within a predetermined range while assuring that noise output from the system is at a low level.

The control system or circuit 15 herein illustrated is responsive to temperature variations for programming operation of respective condition controllers in an air conditioner, i.e., the fan motor 12 and the compressor motor 14 so as to effect efficient cooling of an enclosed area, such as a room, while operating the fan motor and compressor motor so as to maintain noise at a minimum level. The control system 15 includes a temperature sensor 20 having a signal output which is fed to a fan motor control circuit 21 and to a compressor motor control circuit 22, respectively. The respective control circuits 21, 22 are coupled individually, the first to a fan motor energization circuit 24 and the second to a compressor motor energization circuit 25, to operate these condition controllers in accordance with a selected program. A practical example of selected programs for effecting efficient cooling of a room while maintaining the noise level at a low value is represented by respective plots A, B, and C in FIGURE 2, showing the fan motor speeds for different temperatures, and also the respective "on" and "off" points for the compressor motor as a function of temperature.

Figure 2:
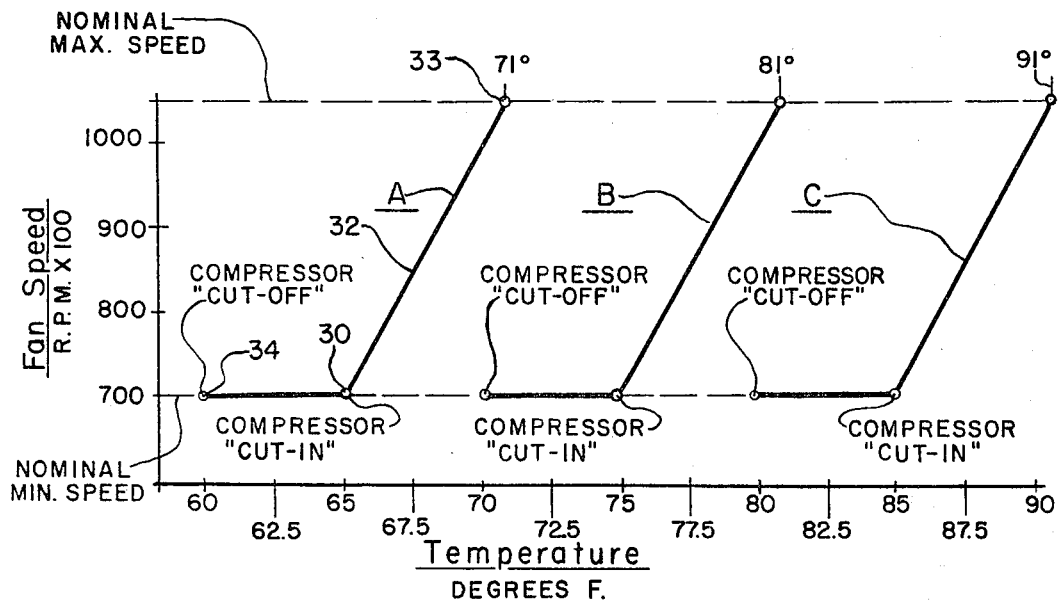
FIGURE 2 is a graph exemplifying the control of a fan motor and a compressor, respectively, in response to a sensed temperature.

In the illustrative examples of programs which can be selected as represented by plots A, B, and C in FIGURE 2, the particular air conditioner used a fan motor which had a minimum operating speed of 700 r.p.m. and a maximum operating speed of 1100 r.p.m. The respective temperature ranges being maintained in each of the programs are Plot A—60° F. to 65° F.; Plot B—70° F. to 75° F.; and Plot C—80° F. to 85° F.

Reviewing the program represented by Plot A, this being exemplary of the other programs, the fan motor speed is maintained at 700 r.p.m. while the sensed temperature is below 65° F. If the temperature rises above 65° F., the latter point being indicated by reference character 30 in FIGURE 2, the control circuit 15 is programmed to increase the motor speed in proportion to an increase in sensed temperature (see portion 32 of Plot A). For the illustrated program, a temperature rise of 5.5° F. is required for the motor speed to increase from the minimum speed to the maximum speed represented by a point 33 in FIGURE 2. At the same time that the fan motor speed begins to increase at point 30 in response to a temperature increase, the compressor motor is cut-in or energized.

The combined operation of the fan motor and compressor motor contributes to cooling the room and thereby lowering the sensed condition. If the air conditioner has the proper capacity for the room in which it is installed, the temperature will decrease and when point 30 is reached the fan motor is again operated at minimum speed. The compressor motor, a less source of noise than the air circulating system, as becomes clear from the subsequent paragraph, remains "on" even though the temperature has been lowered into the desired range. If the cooling load continues to decrease, for example, if the night temperature is lower than the day temperature, even at minimum fan motor speed the room may be cooled below 60° F. At that time, as represented by a point 34, the compressor motor is turned 'off" or "cut-out."

Shown in FIGURE 3 is a graph of loudness measured in sones. The latter is a unit converted from an electronic measurement made on the decibel scale, however, the sones scale permits comparison with humanly recognizable noise levels, such as an operating air hammer, ordinary city traffic, a still night in the forest, etc. The sones noise level of the selected air conditioner is plotted as a function of a fan motor speed between 700 r.p.m. and 1100 r.p.m. for the exemplary motor. A plot 36 represents the noise level with only the fan motor operating and a plot 38 represents the noise level with both the fan motor and the compressor motor operating. It is clear from the graph that the major variation in noise level from the air conditioner occurs when the fan motor speed is changed because the velocity of the air circulated through the air conditioner is affected. The additional noise of the compressor motor, represented in the plot 38, is less of a problem.

*Programmer*

For programming thet operation of the fan motor and the compressor motor, respectively, in the exemplary embodiment so as to maintain the noise output at a low level while effecting cooling of the room, the control system 15 includes the aforementioned temperature sensor 20, respective control circuits 21, 22 and respective energization circuits 24, 25. The system 10 is energized from an A.-C. source represented by lines L1–L2.

Turning first to the respective energizing means 24, 25 the exemplary fan motor energization circuit 24 includes a diode bridge B1 having respective connections 39, 40 for coupling the bridge B1 in series with the fan motor 12 across the source lines L1–L2. Energization current is permitted to flow to the fan motor through the bridge when a silicon-controlled-rectifier SCR1 across another set of bridge connection points 41, 42 is conducting. By controlling the point during each half-cycle when the SCR1 fires, only a specific portion of the A.-C. signal is permitted to flow to the motor thereby operating the motor at a selected speed. This permits proportional speed control with temperature variations as represented by portion 32 of Plot A in FIGURE 2.

The exemplary energizing means 25 for supplying the compressor motor from the source represented by the lines L1–L2 includes a relay coil 44 for actuating a set of contacts 44a. The actuating circuit for the relay includes a diode bridge B2, corresponding to the above described diode bridge B1, having respective connections 45, 46 for coupling the bridge B2 in series with the relay coil 44 across the source lines L1–L2. Actuating current is permitted to flow to the relay 44 when a silicon-controlled-rectifier SCR2 across another set of bridge connection points 48, 49 is conducting. To operate the relay properly, it is desirable to apply a full-wave A.-C. signal thereto. Thus, as explained subsequently, the firing circuit for SCR2, differing from that for SCR1, must always fire the SCR early in each half-cycle. The compressor motor, of course, is energized when the relay coil is actuated and is deenergized when the relay coil is deactuated. Though silicon-controlled-rectifiers and attendant circuitry are shown as comprising the respective energizing means 24, 25, it would be within the skill of one in the art to use other semiconductor switching means, for example a G.E. Triac, to effect the desired control over flow of energizing current to the respective condition controllers.

Turning to the temperature sensing circuit 20, in the present instance this is a bridge circuit 50, including a resistance element 51 and respective resistances 52, 53 and 54 in the other three legs. The resistance element 51 differs from the other resistance in its response to temperature variations, that is the resistivity of element 51 decreases with an increase in temperature. An element of this nature is sold under the name "Thermistor" by the Victor Engineering Company of Union, N.J. The bridge circuit is energized with unidirectional half-wave pulses of energy from a bridge rectifier 55 supplied through a transformer T1 from the source lines L1–L2. Connecting the rectifier bridge 55 to the temperature sensing circuit 20 is a set of conductors 56, 57. Connected in the conductor line 56 is a current limiting resistor 58 and across the lines 56, 57 is a voltage limiting element, presently a Zener diode 59. The Zener diode assures that the half-wave signals fed to the temperature sensing circuit do not exceed a predetermined voltage, as represented by a plot 60 in FIGURE 5a. Though only the first half-wave is shown, the second half-wave is identical.

For sensing an unbalanced bridge condition as would result with changes in temperature changing the resistance of thermistor 51, a transistor-amplifier 61 is provided having respective elements: a base 61a, an emitter 61b and a collector 61c. A resistance 62 in the emitter-collector circuit is provided to adjust load current to produce the necessary output signal utilized by the fan motor control circuit 21 and the compressor motor control circuit 22.

As has been stated, the delay during each half-cycle before the bridge circuit SCR1 is gated to conduction determines the portion of each A.-C. half-wave that is fed to the fan motor 12. Accordingly, by selecting the conduction point, energy flow to the fan motor is controlled and thus its speed. It is desirable to operate the air conditioner fan motor so that there is a minimum speed below which the motor speed is not reduced. This is in order to maintain circulation of air at all times and also to permit use of lower priced motors which have a speed below which circulation of oil in the bearings is hampered. Thus, the fan motor control circuit 21 includes means for assuring that minimal amount of energy is fed to the fan motor 12.

Describing the fan motor control circuit 21, it includes means for gating the SCR1 at desired points in time. A signal-responsive pulse generator, in the present instance a unijunction transistor UJT1 is coupled to SCR1 and, when triggered, gates the SCR1 to conduction. It is, of course, within the teachings of the present invention to utilize a neon bulb in place of the UJT1 or to provide other types of relaxation oscillator circuits wherein the timing of the gating pulse for the semiconductor switching device SCR1 is selectable to control energization of the fan motor.

As is known by those skilled in the art, a unijunction transistor is a semiconductor element which has a pair of ohmic contacts, a *base-one* and a *base-two* and a rectifying contact, an emitter. The ohmic contacts are connected across a source of unidirectional voltage. The magnitude of the latter voltage determines the *peak-point* triggering voltage for the unijunction transistor. When the peak-point triggering voltage is applied between the *emitter* and *base-one* of the unijunction transistor an emitter current flows.

The UJT1 has respective electrical elements, a base 64 (base-one), another base 65 (base-two) and an emitter 66. The UJT1 is connected across conductors 56, 57 to receive a unidirectional voltage therefrom, the base 65 coupled through a temperature compensating resistance 67 to conductor 56 and the base 64 coupled through a primary 68 of a transformer T2 to the conductor 57. For triggering the UJT1, a capacitor 69 is connected between the emitter 66 and the conductor 57. When the capacitor charges up to the peak point voltage of UJT1, the latter is triggered and permits the capacitor to discharge through the inherent resistance of the transformer primary 68. As a result, a voltage pulse appears across a secondary 70 of the transformer T2. The transformer secondary is connected to a gate 71 of SCR1 to apply a gating pulse and permit SCR1 to conduct when it is forward biased. The capacitor 69 is also connected across the unidirectional voltage source represented by lines 56, 57 through a charge-up resistance 72.

For minimum speed operation of the fan motor, the capacitor charge-up circuit includes only the resistance 72 and the capacitor 69, the voltage across the capacitor increasing, as shown by plot 73 in FIGURE 5e, to a peak-point voltage 74 in a portion of the full 180 degrees in a half-cycle, the time being represented by a reference character α. The UJT1 emitter conduts when the peak point voltage is applied thereto and thus the capacitor discharges after a time α to apply a pulse represented by plot 75 in FIGURE 5f to the gate of SCR1.

The result is that the SCR1 will conduct and permit energy to flow to the fan motor 12 as represented by a plot 76 in FIGURE 5g. Summarizing, the time required to charge up capacitor 69 through resistance 72 determines the point at which UJT1 is fired. At that point the capacitor 69 discharges and provides a voltage pulse to gate SCR1 to conduction and thereby permit energy to flow to the fan motor 12. By selecting the value of the charging resistance 72, the point in time that the SCR1 is fired each half-cycle can be fixed, thus assuring that it is not too late so that a minimum of energy is supplied to the motor 12 assuring maintenance of minimum speed. Only the first pulse is required to trigger SCR1 to conduction and subsequent pulses during the half-cycle are superfluous as a silicon-controlled-rectifier continues to conduct once it is turned on even though the gating signal is removed, until a time when the forward bias across the anode and cathode is removed.

To fire the SCR earlier in each half-cycle and thereby increase the amount of energy supplied to the fan motor 12 so as to raise its speed, a signal from the temperature sensing bridge transistor 61 is utilized to bias transistor 80 to increased conduction. The latter includes a base 80a connected to a resistance 81, an emitter 80b connected to the supply line 56 through a biasing resistance 82 and a collector 80c connected to capacitor 69 through a resistance 84. The resistance 81 is connected across the D.-C. supply lines 56, 57 through the collector-emitter circuit of transistor 61, and resistors 62 and 53. As a result, the biasing of transistor 61 to greater conduction by unbalancing the temperature sensing bridge 20, results in an increase in current flow through resistance 81. The collector and emitter circuit of transistor 80 are connected in series with the triggering capacitor 69 (R82, 80b, 80c, R84, C69). As the transistor 80 is biased to higher conduction it will supply capacitor 69 with additional charge which, combined with the charge flowing to the capacitor 69 through resistance 72, causes the capacitor to reach the triggering or peak point voltage of UJT1 sooner.

This is represented in FIGURE 5b by a plot 85 which shows the SCR being fired after the passage of a time represented by θ. FIGURE 5c shows a pulse 86 applied to the gate of SCR1 to fire it. Again only the first pulse is necessary to effect conduction during a half-cycle. It is noted that the angle θ is less than the angle α so that firing occurs earlier during each half-cycle of operation where a supplemental charge is provided for capacitor 69. The supplemental charge is proportional to an increase in temperature sensed by the thermistor 51. A plot 88 in FIGURE 5d represents an energizing signal applied to the fan motor 12. This energizing signal would effect operation of the fan motor and approximately maximum speed.

The response of transistor 80 to changes in temperature is adjustable. By adjusting the position of the movable tap which couples the transistor base 80a to the resistance 81, the rate of change of fan motor speed with temperature change can be programmed into the device.

In order to maintain noise at a low level, it is advantageous not only to reduce the fan motor speed and thereby reduce the velocity with which air is circulated in the air conditioner, but also to operate the compressor motor 14 substantially only when it is necessary to cool the enclosure or room. To this end, the compressor motor control circuit 22 is programmed in conjunction with operation of the fan motor control circuit 21 to turn "on" and turn "off" the compressor at predetermined temperature settings.

The control circuit 22 receives unidirectional half-wave pulses of A.-C. voltage over resistor 92 and conductor 90, and a common conductor 57 both connected to the bridge circuit B2. The latter includes SCR2 which, as explained earlier, when triggered to conduction permits energy to flow from lines L1, L2 to the relay coil 44 which operates contacts 44a to complete an energizing circuit for compressor motor 14. The rectifier signal from conductors 90, 57 is aplied to a Zener diode 91 through a current-limiting resistor 92. The signal as it appears across the Zener 91 is represented by plot 93 in FIGURE 6a, assuming that SCR2 is deenergized and not conducting.

A signal-responsive pulse generator is provided for gating SCR2 to conduction, in the present instance a unijunction transistor UJT2, having a base 94 (base-one), another base 95 (base-two) and an emitter 96. Other pulse generators, such as a neon discharge bulb or a relaxation oscillator can be used also. The UJT2 receives the signal from across the Zener diode 91, a temperature compensating resistance 97 connecting the base 95 over resistor 92 to conductor 90 and a voltage-dropping resistance 98 connecting the base 94 to conductor 57. A triggering capacitor 100 is connected between the emitter 96 and the common conductor 57.

The compressor motor has a specific "on" point when temperature is rising, exemplarily shown as point 30 in FIGURE 2, and a specific "off" point when temperature is falling, represented as point 34 in FIGURE 2. Accordingly, once the temperatures at these particular points are sensed, the relay 44 must be operated. To achieve this, in the exemplary embodiment a threshold circuit is utilized. Explaining, as long as the triggering signal is not achieved, the compressor motor is not energized. However, once the signal from the temperature sensor thermistor 51 indicates that the compressor should be turned on, then the circuit must immediately energize the relay coil 44 to effect completion of the energizing circuit for the compressor motor.

Describing the compressor motor control circuit 22 in further detail, a signal responsive to temperature changes is received across a resistance 102. Explaining, the latter is connected in series with the collector-emitter circuit of transistor 61 so that, for example, when a temperature increase biases the transistor to greater conduction, the increased current through resistance 102 causes a larger voltage drop. The voltage change across the resistance 102 is utilized to bias another transistor 104. The latter includes a base 104a connected to the resistance 102, an emitter 104b connected through a resistance 105 to conductor 56, and a collector 104c connected through a resistance 106 to one end of capacitor 100. As the voltage increases across the resistance 102 the transistor 104 is biased for greater conduction; thus, the flow of charge through transistor 104 to capacitor 100 increases so that in each half-cycle capacitor 100 charges to a higher voltage, finally sufficient to trigger UJT2.

A supplemental charging circuit effects the threshold operation of circuit 22. To this end, a voltage divider network including a pair of resistances 108, 109 are connected across the energizing bridge B2, i.e., across points 48, 49 by conductor 90 and series resistor 92, along with conductor 57. Resistance 108 includes a slidable tap 107 permitting pick-off voltages present across resistance 108. The tap 107 is connected to the UJT2 emitter and one end of the capacitor 100. Connected between the conductor 90 and tap 107 are variable resistance 110 in series with a capacitance 111.

During ordinary operation, assuming that the compressor motor 14 is "off" and that the temperature is rising, the capacitor 100 does not charge to a voltage sufficient to trigger UJT2 to conduction when substantially full voltage is present across the respective UJT2 bases 94, 95. It is, of course, true that in each half-cycle the unidirectional voltage from Zener 91 applied across the respective UJT2 bases decreases to a point where the charge on the capacitor 100 is sufficient to fire the UJT2. However, the point of firing is late in each half-cycle and in addition provides only a small voltage drop across resistance 98, insufficient to effect operation of the energizing means to operate relay 44.

Even with the low level firing of the UJT2 in each half-cycle, the capacitor 100 discharges as does the supplemental charging capacitor 111. For setting a limit charge-up value for capacitor 100 so that the UJT2 is not triggered at full voltage until sufficient charge is received from transistor 104 to indicate that temperature has risen to a predetermined value as represented by point 30 in FIGURE 2, the tap 107 is adjusted. The voltage drop across resistance 109 and the portion of resistance 108 below tap 107, as viewed in FIGURE 4, does not provide sufficient charge for capacitor 100 to trigger UJT2. As the temperature rises, the current flow through transistor 104 increases to a point where capacitor 100 receives additional charge sufficient to trigger UJT2 to conduction while full voltage is present thereacross. When UJT2 fires at full voltage a gating pulse is fed to SCR2 resulting in energization of relay coil 44. Explaining the operation of the exemplary circuit to guarantee application of near full line voltage to relay coil 44 and thereby assure positive closing of contacts 44a, the supplemental charging capacitor 111 causes the voltage across capacitor 100 to take the shape of a pulse having a leading peak edge. This is because at the beginning of each cycle, as the supplemental charging capacitor 111 is charging, it effects flow of additional current to capacitor 100. Thus, the leading peak edge assures early firing in each half-cycle of UJT2.

As shown in FIGURE 6b, once SCR2 is gated for conduction the voltage across capacitor 100 decreases to substantially zero as the voltage supplied to the compressor motor control circuit 22 decreases to substantially zero. This is because the signal applied to the circuit 22 is received from across SCR2, and while the latter is conducting, the voltage drop thereacross is approximately one volt or less.

It is clear from the foregoing that though a preferred embodiment is described for sensing and controlling temperature, other conditions may be sensed, for example, humidity, pressure and the like, and respective condition controllers may be programmed in accordance with the teachings of the present invention to efficiently maintain the condition at a predetermined value while minimizing noise.

Though particular components for a preferred condition controlling device have been described, there are equivalents which may be substituted for these components without varying from the teachings of the present invention. These equivalents are intended to be included within the scope of the appended claims.

I claim as my invention:

1. In a condition controlling device having a first condition controller and a second condition controller respectively, an improved control system comprising in combination, a first energizing means for the first condition controller and a second energizing means for the second condition controller, said respective energizing means being responsive to a gating signal to energize said respective condition controllers, a condition sensing circuit for producing a signal proportional to condition variations, a first circuit for gating said first energizing means including a first triggering means the latter being responsive to said sensing circuit signals, said first gating circuit thereby effecting operation of the first condition controller at a minimum level below a first predetermined value of sensed condition and proportionally increasing the level of operaiton of the first condition controller toward a maximum level as the sensed condition increases above said first predetermined value, and a second circuit for gating said second energizing means including a second triggering means the latter being responsive to said sensing circuit signal, said second gating circuit effecting deenergization of the second condition controller in response to sensing a condition decrease below a predetermined second value and effecting energization of the second condition controller in response to sensing a condition increase above a predetermined third value so as to maintain noise output of the device at a minimum value while effecting efficient control of the condition.

2. In claim 1 said first energizing means and said second energizing means including a first semiconductor switching device and a second semiconductor switching device, respectively, and said first gating circuit effecting operation of the first switching device and said second gating circuit effecting operation of the second switching device.

3. In claim 2 wherein said first gating circuit includes a first pulse generator coupled to said first neergizing means and said second gating circuit includes a second pulse generator coupled to said second triggering means for effecting operation of said first semiconductor switching device and said second semiconductor switching device, respectively.

4. In claim 2 wherein the sensed condition is temperature and the first condition controller is a fan motor or the like and the second condition controller is a compressor motor or the like, said first gating circuit effecting fan motor operation at a minimum speed below a first sensed temperature and responsive to said sensing circuit signals increasing above said first temperature to proportionally increase the fan motor speed to a maximum speed, said second gating circuit effecting deenergization of the compressor motor in response to sensing temperature decrease below a predetermined second value and effecting energization of the compressor motor in response to sensing temperature increase above a predetermined third value so as to maintain noise output of the air conditioner at a minimum value while effecting efficient control of temperature.

References Cited

UNITED STATES PATENTS 3,267,994  8/1966  Sones et al. _____ 165—28

EDWARD J. MICHAEL, *Primary Examiner.*